Oct. 18, 1960     E. M. IRWIN     2,957,129
MAGNETIC TESTING APPARATUS AND METHOD
Filed March 30, 1956
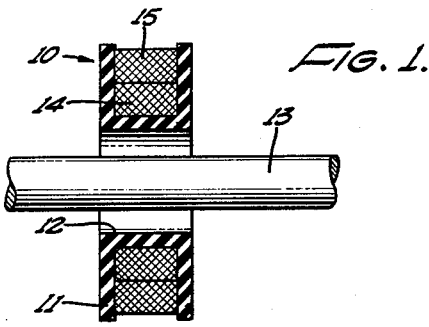
FIG. 1.
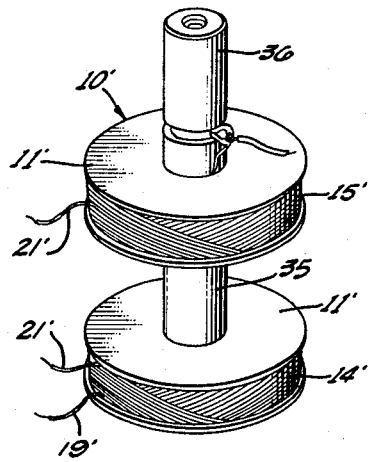
FIG. 3.
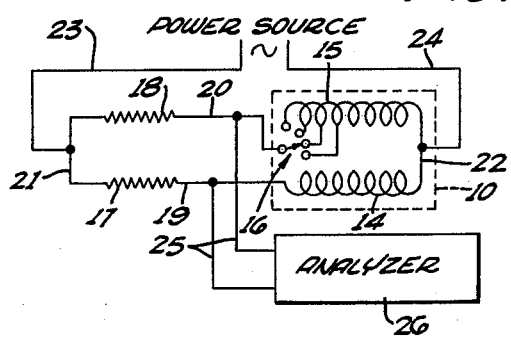
FIG. 2.
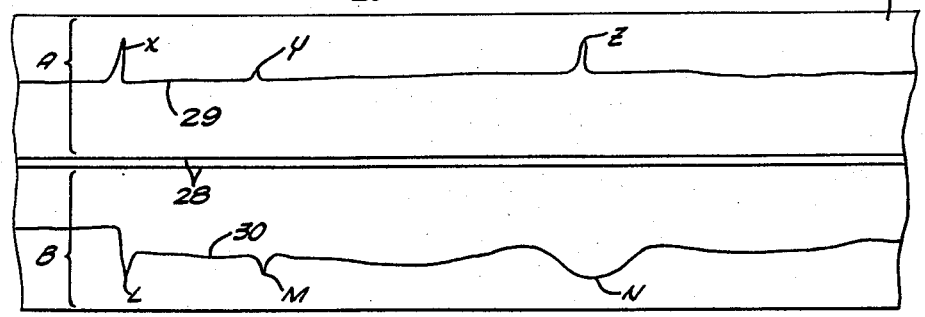
FIG. 5.
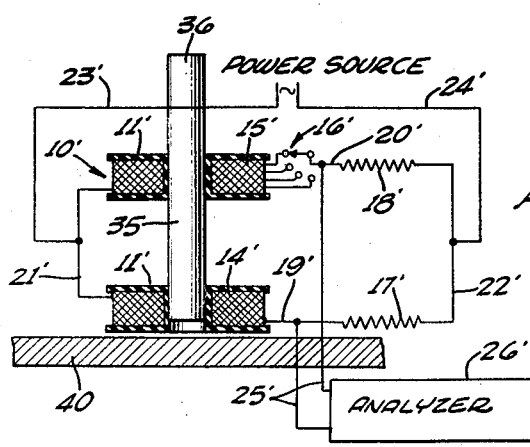
FIG. 4.
EMMETT M. IRWIN
    INVENTOR.
BY 
ATTORNEY

United States Patent Office 2,957,129
Patented Oct. 18, 1960

2,957,129

MAGNETIC TESTING APPARATUS AND METHOD

Emmett M. Irwin, 2179 Lorain Road, San Marino, Calif.

Filed Mar. 30, 1956, Ser. No. 575,224

15 Claims. (Cl. 324—37)

This invention relates to apparatus and methods for testing metal specimens and more particularly to new and improved magnetic test apparatus utilizing a pair of similar coils for the dual purpose of creating an exciting magnetic field within the specimen and of activating an analyzer device to indicate the physical properties thereof. The methods and apparatuses disclosed represent improvements over those described in my United States Patent No. 2,555,853, granted June 5, 1951, for a Magnetic Testing Apparatus and Method. The present invention also represents certain improvements over those described in my copending application for United States Letters Patent, Serial No. 540,430, filed October 14, 1955, now Patent No 2,855,564, entitled "Magnetic Testing Apparatus and Method."

The function of a magnetic testing apparatus is to determine with accuracy and reliability certain physical properties and conditions of a metal specimen without cutting into the specimen or subjecting it to chemical treatment or optical inspection. Equipment of this general type has been used for inspecting both small and large metal parts for fatigue, flaws, cracks, hardness, soft spots and other defective conditions having a direct bearing on the suitability of the parts for an intended use or for continued service. For example, magnetic test equipment has been very useful in testing sucker rods and drill pipes employed in the oil well drilling industry. In this application of magnetic testing equipment, no difficulty is experienced in distinguishing between sucker rods of oil well drilling apparatus which are suitable for use at one well level but not at another. This is for the reason that a rod weakened by fatigue to a known extent can provide limited additional service with safety if used at one location in the sucker rod assembly but is unsuitable for use at another location where the load is greater. However, the testing coil equipment suitable for testing large sucker rods and pipes is unsuitable for testing a great many metal parts and assemblies wherein the spacing between parts is too small to admit the test coil, as for example the individual blades of turbine wheel assemblies; or in other instances in which the metal part is so shaped that the use of an encircling test coil is not feasible, as for example the hub assembly of a turbine rotor.

The present invention avoids the foregoing and other disadvantages of prior magnetic testing apparatus by the use of an improved test coil unit so designed that the same pair of small coils serves both to create the cyclically varying flux field within the specimen and to activate an analyzer device in a manner reflecting the physical properties of portions of the specimen undergoing test, and further characterized in that the two coils are differentially spaced from the specimen. Of particular significance is the fact that the new test coil unit has been found equally effective when designed to encircle the part under test or when designed for use at one side of the specimen as where the specimen is too large for encirclement by the test coil or where the use of the test coil on one side only of the specimen is more convenient or expedient.

In view of the foregoing, it is a primary object of the present invention to provide a new method of determining the physical properties of both magnetic and non-magnetic metal bodies.

Another object of the invention is to provide a new and improved test coil unit obviating the limitations and disadvantages of prior test coils and providing simple, compact, easily manipulated means by which zones of a metal part can be tested for fatigue, defects and other characteristics relating to its suitability for service.

An important object of the invention is to provide a magnetic test coil utilizing the same pair of coils for the dual purpose of creating a cyclic flux field to excite a body being tested and also to activate analyzer equipment in a manner reflecting the physical properties of the body.

Another object of the invention is the provision of magnetic apparatus featuring a pair of test coils serving in the dual capacity of primary and secondary coils adapted to be spaced differentially from the specimen zone undergoing examination.

Still another object of the invention is the provision of a magnetic test coil unit suitable for use when positioned at one side only of a metal specimen.

A further object of the invention is to provide a magnetic test coil unit having a pair of coils forming part of a highly sensitive electrical bridge and wherein the same coils create a cyclic flux within a test specimen and also activate an analyzer device.

These and other objects and advantages of the invention will be apparent from the following specification and claims considered in connection with the attached drawing to which they relate.

Referring now to the drawing in which two preferred embodiments of the invention are illustrated:

Figure 1 is a longitudinal sectional view of a magnetic test coil constructed in accordance with the present invention and showing a test specimen extending through its open center;

Figure 2 is a schematic representation of the test coil connected in circuit with a power supply and an analyzer device;

Figure 3 is a perspective view of a second embodiment of the test coil designed to be positioned upon one side of a specimen under test;

Figure 4 is a schematic diagram similar to Figure 2 showing the second embodiment of the test coil connected to a power supply and an analyzer device; and Figure 5 is a plan view of a tape recording of typical test results obtainable with the test coil units of this invention.

Referring again to the drawing and particularly to Figures 1 and 2 showing one preferred embodiment of the invention, the test coil unit generally designated 10 will be seen to comprise a non-metallic spool 11 having a central opening 12 slightly larger than the maximum cross-sectional dimension of a metal body 13 to be examined. Wound upon spool 11 are a pair of concentric coils 14 and 15 each containing substantially the same number of turns of suitably insulated wire. Outer coil 15 is preferably provided with a multiple contact switch 16, each contact of which is tapped to a different one of the end turns of the coil thereby providing a convenient means for varying the effective number of turns of coil 15 included in circuit with the power supply. While switch 16 is not essential, it provides means for changing the sensitivity of the apparatus under different test conditions and is an aid in balancing the analyzer as will be readily understood by those skilled in the use of this equipment.

Coils 14 and 15 form two of the equal sides of an electrical bridge circuit, the other two sides being formed by a pair of resistors 17 and 18 having identical resistance values. As clearly shown in Figure 2, one pair of junctions for the bridge circuit comprises lead 19 connecting resistor 17 to coil 14 and a lead 20 connecting resistor 18 to coil 15 by way of switch 16. The second pair of bridge junctions are formed by leads 22 and 21, respectively, connecting the opposite ends of coils 14 and 15 together and the opposite ends of resistors 17 and 18 together. This bridge circuit is energized from any suitable alternating current power source as for example a 110 volt, 60 cycle commercial supply connected to bridge junctions 21 and 22 through power supply leads 23 and 24.

The bridge junctions 19 and 20 are connected through a pair of leads 25 to a conventional analyzer device 26 provided with suitable indicating or control means for controlling appropriate recording, specimen marking or specimen ejecting equipment. One suitable analyzer associated with a galvanometer-controlled pen-recorder providing a graphic record of the test results is illustrated and described in my United States Letters Patent 2,673,613 granted March 30, 1954. As explained in detail in that patent, the analyzer is first adjusted to obtain a null balance with a calibration specimen located within the test coil since the presence of the specimen has a marked influence on the voltages induced in the test coils. In obtaining such a balance, it may be desirable to adjust switch 16 to change the number of effective turns of outer test coil 15 although the test coil unit is substantially self-balancing by reason of the described equal impedance values of the two resistors and of the two coils.

As explained in Patent 2,673,613, the analyzer includes suitable means providing an indication of the magnitude and direction of change of the net induced voltages in coils 14 and 15. A pair of galvanometers serve this purpose very well since the operator merely watches the deflection of the needle on each and compares readings as different sections of the test specimen are moved into the test zone of the coil unit. A pen-recorder type galvanometer may also be used if a permanent record of the test results is desired. Inasmuch as the traces made by the two recording pens of the latter type are useful in conveying a clear understanding of the invention, a section of tape bearing the trace lines of a typical test is shown in Figure 5 and will be referred to in the following portions of this description. Recorder tape 27 is divided into two halves A and B by longitudinally extending divider lines 28. It will be understood that the pen-recorder of the galvanometer responsive to the current in phase with the power supply current to the test coils registers on portion A of the tape and that the pen of the second recording galvanometer having the current for its coil flowing in quadrature with the power supply current registers on portion B of the tape. After the analyzer has been adjusted to obtain a null balance, the two recorder pens will be approximately in their respective zero positions and the respective trace lines 29 and 30 drawn by each will extend longitudinally along the transverse centers of portions A and B of the tape 27. The calibration specimen may now be replaced with a test specimen of unknown properties.

As the body 13 undergoing test is moved slowly through the coil axially, the analyzer will trace a graphic picture indicative of conditions within the specimen such as, for example, the irregular trace lines 29 and 30 on the tape 27 illustrated in Fig. 5. As indicated above, the galvanometer driving the pen for trace 29 is adjusted to respond to voltages in phase with the exciting current for the test coils and therefore indicates the watt loss occasioned by the eddy currents flowing in the specimen. The galvanometer driving the pen for trace 30 is adjusted to read voltages in quadrature with the power supply current and is unaffected by changes reflected by the first galvanometer. It will be understood that change in the watt loss, indicated by trace 29, reflects a change in the internal resistance of the specimen since the exciting flux field creating the eddy current remains substantially constant. The changes in the quadrature voltages represented by trace line 30 are affected primarily by changes in the stresses within the specimen and, these voltages being in quadrature with the current, are unaffected by the changes reflected by the first galvanometer.

It has been observed that fatigue failure occurs in stages. At first there occurs an increase in the internal stress within the specimen without an accompanying change in internal resistance. This change is evidenced by a change in hardness of the material and is represented by variations in the quadrature voltages. As the fatigue progresses, the hardness continues to increase, and a change in the internal resistance appears, indicating internal strain and slippage between the grains of the metal. In still later stages of fatigue, slippage takes place at an accelerated rate and little change in stress is observed. Eventually failure of the material occurs.

With the foregoing factors in mind, the interpretations applicable to traces 29 and 30 in the section of tape shown in Figure 5 will be described.

The tape 27 is suitably supported and driven to advance lengthwise beneath the recorder pens. Since the analyzer has been adjusted to its null balance position with respect to a calibration specimen, the needles will trace straight lines along the centers of the halves A and B of the tape provided the properties of test specimen 13 remain uniform and are identical in all respects with those of the calibration specimen used to center the lines. Deflections laterally towards the opposite edges of tape 27 from this zero or null balance position of the trace lines indicate variations in molecular structure within the test specimen from those present in the calibration specimen. For example, the deflections of trace line 29 at the points designated X, Y and Z indicate the presence of a flow or a crack in the specimen under examination at the particular point in its length corresponding to the position of these points along tape 27. Referring to trace line 30, it will be noted that directly across the tape from deflections X, Y and Z, are oppositely directed deflections designated L, M and N, respectively. These deflections indicate the presence of serious stress and fatigue conditions in exactly the same positions as the fractures or flaws indicated by deflections X, Y and Z in trace line 29. It is also to be noted that between points L, M and N, trace line 30 var'es irregularly and is displaced downwardly to a marked degree from its normal central position thereby indicating greater hardness and greater internal stress in the portions of the specimen to the right of point L and a developing fatigue condition. The absence of similar deflections in trace line 29 is due to the fact the increasing stress within the material as its hardness increases is not accompanied by any significant change in internal resistance, and the in phase voltages are unaffected until fissures and cracks actually develop.

It will be understood that the magnitude of the deflections of trace 30 from the zero or null balance base line indicates the relative severity of the fatigue condition and the change in hardness of the specimen relative to the calibration specimen. If the magnitude of the deflection is small, the operator will know that the specimen has been stressed to its endurance limit but not appreciably beyond this limit. If the specimen had been stressed excessively a check or crack would have developed and sharp deviations in both trace lines 29 and 30 would have indicated this failure.

Summarizing the foregoing, if trace line 29 does not deviate from the null balance or center line of portion A of the tape, it is indicated that no flaws or fractures are present and that the specimen is as sound and free from these flaws as the calibration specimen. Despite this negative indication as respects flaws and fractures, trace line 30 may show marked deviation from zero or null balance base line, indicating fatigue conditions resulting from the stressing of the specimen beyond its endurance limit and the presence of internal stresses within the specimen. Any specimen which has been in service and stressed to its endurance limit will show some fatigue, the degree or extent of which is indicated by the extent of the displacement of trace line 30 from its central zero position. If the displacement of trace line 30 is moderate and does not vary to any great extent along the specimen, the specimen may be approved for further service, whereas a wide range deflection at any point is valid cause for rejecting the specimen for further critical service. A deflection in trace line 29 indicates a crack or flaw and unless the deflection is very small, rejection of the specimen for exacting service is clearly indicated.

The second embodiment of the invention illustrated in Figure 3 is generally similar to the first described embodiment, differing therefrom only as respects the design of the test coil unit and its mode of use. For this reason the various components have been designated by the same numerals as the corresponding or similar components of the first embodiment and distinguished therefrom by the addition of a prime. The test coil unit 10' comprises a pair of similar flat coils 14', 15' wound on separate non-metallic spools 11' each of which is supported on a rod 35 of suitable insulating material such as porcelain, plastic or the like. Coil 14' and its supporting spool 11' are rigidly mounted at one end of rod 35 with the outer face of the spool lying flush with or slightly beyond the end of the rod. Coil 15' is supported on rod 35 coaxially of coil 14' and parallel thereto but its spool 11' is preferably adjustable along the rod as is desirable in the use of the coil unit in testing metal specimens of different thicknesses or of different materials. Rod 35 is somewhat longer than is required for the maximum spacing of coils 14' and 15' so that one end provides a handle 36 by means of which the test coil assembly may be moved from place to place along the surface of a body under examination such as that represented by metal plate 40 in Figure 4. The specimen shown in the drawing comprises a plate of uniform thickness but it may have any configuration, may vary in thickness, and may be magnetic or non-magnetic.

The remaining components of the second embodiment are identical in all respects to the correspondingly numbered parts of the first embodiment and all parts connected are in circuit in the same manner. Thus, it will be understood that the electrical bridge formed by the test coils and the two equal resistors is energized in the same manner. Likewise in using the apparatus, analyzer device 26' is balanced or checked against a calibration specimen to obtain the proper zero setting of each of the galvanometers, or of the pen recorders of the analyzer, as in the first embodiment. One of the principal differences between the two embodiments lies in their mode of use, test coil unit 10' being customarily manipulated by handle 36 to pass the unit in close proximity to one surface of the specimen with the axis of coils normal to the surface, as is clearly illustrated in Figure 3. This contrasts sharply with the construction and mode of use of coils 14 and 15 of the first embodiment since these must be sufficiently large in diameter as to encircle the maximum cross-sectional dimension of the specimen being tested which is passed therethrough in the test operation. The coils of test coil unit 10' may be very small particularly if the specimen being tested is relatively thin such as the plate-like specimen 40 illustrated. If the specimen under test is relatively thick, as the hub of a turbine wheel or the blades of a large propeller or helicopter wing, the diameter of the test coils though appreciably larger to provide the required larger flux field, would still be much smaller than required for use in the mode required for the first embodiment of the invention. While unit 10' may be passed over the specimen surface in any direction, it is preferable to follow a predetermined pattern such that strips having a width corresponding to the diameter of coil 14' are covered in sequence until the entire surface of the specimen has been traversed by the cyclic flux fields emanating from coils 14' and 15'. Whatever the pattern of movement, however, the resulting opposed voltages induced in these two coils as unit 10 is passed over the specimen are impressed upon analyzer 26' to activate the galvanometers thereof to indicate the presence and nature of the physical properties of the specimen relative to a standard calibration member in the same manner described above in connection with Figures 1 and 2.

The second embodiment comprises a simple and versatile test device in that the size of the test coils may be varied widely independently of the size of the specimen to be tested, a different size coil merely serving to vary the size of the test area being examined in one position of the test unit. For example, a very small diameter coil permits testing of a small area of the specimen, whereas a larger coil creates a larger flux field through the test specimen to effect the examination of a much wider and deeper portion of the specimen. It will also be recognized that the sensitivity of the second embodiment can be varied by moving coil 15' closer to or further from coil 14' and also by varying the position of switch 16' to change the effective number of turns of coil 15' included in the bridge circuit.

While the embodiments of the apparatus herein shown and disclosed in detail are fully capable of obtaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. That method of detecting variations in the physical properties of a metal specimen which comprises, energizing a pair of adjacent similar coils from an alternating current source to create a cyclically varying magnetic flux, traversing a test zone of a specimen under test with said cyclically varying flux and while one coil is closer to the specimen than the other coil, said flux being effective in passing through a portion of a test specimen to induce a counter electromotive voltage in each of said pair of coils, opposing the voltages so induced to one another, and comparing fluctuations in said opposed induced voltages obtained while different portions of the specimen are within said test zone to determine variations in the physical properties of different parts of the test specimen.

2. That method of determining the nature and extent of molecular rearrangements within a metallic specimen which comprises, energizing a pair of similar coils connected in parallel across an alternating current power source to create a common cyclic flux field traversing a portion of a metal specimen in a test zone with the flux field of one coil being closer to the test specimen than the flux field of the other coil, said flux field being effective to induce a counter electromotive voltage in each of said coils, opposing said induced voltages to one another, and comparing variations in a component of said opposed induced voltages as said cyclic flux passes through different portions of a test specimen to indicate the physical characteristics of the specimen.

3. That method of testing a metal specimen for physical properties internally thereof which comprises energizing a pair of substantially identical coils from an alternating current power source to produce cyclic flux fields extending in the same direction, passing a greater portion of the flux field of one coil than of the other through a metal specimen thereby effecting the induction of counter electromotive voltages of different magnitudes in the same coils producing said flux fields, opposed said induced voltages to one another, and utilizing the net voltage difference to indicate the nature of physical properties in the portion of the specimen traversed by said flux field.

4. That method of testing a metal specimen for physical properties internally thereof which comprises energizing a pair of substantially identical coils from an alternating current power source to produce cyclic flux fields extending in the same direction, passing a test specimen through said flux fields centrally thereof and with a greater portion of the flux field of one coil than of the other traversing said specimen, said flux fields being effective to produce a counter electromotive voltage of differing values in each of said coils, opposing said voltages to one another, and utilizing said counter electromotive voltages to indicate the nature and variation in physical properties in said specimen as different portions thereof are traversed by said cyclic flux field.

5. That method of testing a metal specimen for physical properties internally thereof which comprises energizing a pair of substantially identical coils from an alternating current power source to produce cyclic flux fields extending in the same direction, passing said coils across one surface of a metal test specimen with one coil closer to the specimen surface than the other coil, utilizing differential portions of the cyclic flux field from said coils traversing said specimen opposite said coils to effect the induction of differential counter electromotive voltages in said same coils, opposing said differential voltages to one another, and comparing the net differences in said voltages as different portions of the specimen are traversed by said cyclic flux field to indicate the presence of varying physical properties in the test specimen.

6. In combination, a testing instrument for determining physical properties of a metal specimen, said instrument comprising a pair of similar coils having substantially equal impedance values, and including means for supporting the same in superimposed relation at different radial distances from a test specimen, means for energizing said coils from an alternating current power source to produce a cyclically varying flux pattern in a portion of a test specimen, said cyclic flux being effective to induce opposed counter electromotive forces in said coils, and analyzer means responsive to said counter electromotive forces for indicating fluctuations therein as said cyclically varying flux pattern traverses different portions of a test specimen thereby indicating variations in the physical properties of different portions of the specimen.

7. A magnetic testing apparatus for determining certain physical properties of a metallic specimen, said apparatus comprising a pair of coils arranged about a common axis and including means for supporting the same at different radial distances from a test specimen, means for energizing said coils from a common alternating current source to produce additively a flux field having a cyclic pattern extending beyond the surface areas of said coils, said cyclic flux field being effective in traversing a metallic specimen to induce a counter electromotive force in each of said coils of a magnitude related to the distance of each coil from the test specimen, and means energized by the net difference in said induced voltages to provide a visual indication of the same.

8. In combination, testing instrument for detecting changes and variations in the physical properties of a metal specimen, said instrument comprising a pair of juxtaposed coils having substantially equal impedance values adapted to be spaced at different radial distances from a metal specimen, means for energizing said coils from a common alternating current power source to create additively a cyclic flux field traversing a portion of a metal specimen under test whereby counter electromotive voltages are induced in said coils proportional to the distance of said coils from the specimen, means for opposing said induced voltages to one another, and means for comparing variations in the resulting net value of said induced voltages as said cyclic flux traverses different portions of a test specimen.

9. In apparatus for testing metal for fatigue, flaws and variations in metallurgical properties, an electrical bridge circuit comprising a pair of series connected coils and a pair of series connected impedances joined in a continuous circuit, said coils having similar electrical properties and cooperating additively to produce a flux field and including means for supporting the same at different radial distances from a test specimen, said impedances being substantially identical with one another, means for energizing said coils and impedances in parallel from an alternating current power source, said coils being effective when energized to create a cyclic flux field operable upon traversing a test zone of a metal to induce opposed counter electromotive forces in said coils, the values of said induced counter electromotive forces being a function of the distances of said coils from the test zone of the metal being tested, and analyzer means connected across said bridge circuit at the junctions of said coils and of said impedances with one another and responsive to the net difference in said opposed counter electromotive forces to indicate metallurgical properties in the portion of the metal traversed by said cyclic flux field.

10. In apparatus for testing metal as defined in claim 9 wherein said pair of coils have substantially identical electrical characteristics and are arranged concentrically about the same axis.

11. In apparatus for testing metal as defined in claim 9 wherein said pair of coils have substantially identical electrical characteristics and means are provided for supporting said coils in a predetermined relation laterally of one another.

12. In apparatus for testing metal as defined in claim 9 wherein said pair of coils are disc-like, and means for supporting said coils in parallel spaced relation to one another.

13. In apparatus for testing metal as defined in claim 9 including non-metallic means adjustably supporting said coils in parallel relation at different distances from one another, and means for moving said coils as a unit over the surface of a metal to be tested with one coil closer to said metal than the other.

14. In combination, apparatus for determining the internal physical properties of a metallic body, said apparatus comprising a pair of similar coils, means supporting said coils in axially spaced relation so that one coil may be placed closely adjacent the surface of the body with the other coil spaced therefrom, said coils being connected to create additively a flux field having a cyclic pattern when energized from a common alternating current power source, the physical characteristics of a metal body traversed by said cyclic flux pattern being effective to induce voltages of different magnitudes in said pair of coils, and means responsive to said induced voltages to indicate a physical condition prevailing internally of said metallic body.

15. In combination, apparatus for determining certain internal physical properties of a metallic body, said apparatus comprising a pair of coils having substantially identical impedance values, a pair of identical impedance means connected in series with one another and with said pair of coils, means for energizing said coils and said impedances with alternating current from the connections between said coils and between said impedance means to create additively a cyclic flux, means supporting said coils in offset relation so that one may be positioned closer than the other to the surface of a specimen being tested, said cyclic flux in traversing a metallic body being effective to induce a counter electromotive force of different magnitude in each of said coils depending on the distance of each from said body, and means for analyzing the net difference in the counter electromotive forces induced in said coils, said analyzer means being connected across the connections between said coils and said impedances.

References Cited in the file of this patent
UNITED STATES PATENTS

| 2,353,211 | Zuschlag | July 11, 1944 |
| 2,415,789 | Farrow | Feb. 11, 1947 |
| 2,441,380 | Zuschlag | May 11, 1948 |
| 2,756,385 | Matthews | July 24, 1956 |